United States Patent [19]

Perbet et al.

[11] Patent Number: 5,150,105
[45] Date of Patent: Sep. 22, 1992

[54] SYSTEM FOR THE DISPLAY OF COLOR IMAGES ON MATRIX DISPLAY PANELS

[75] Inventors: Jean-Noël Perbet, Eysines; Pierre Bossoutrot; Philippe Geneste, both of Merignac, all of France

[73] Assignee: Thomson CSF, Paris, France

[21] Appl. No.: 681,451

[22] Filed: Apr. 4, 1991

Related U.S. Application Data

[63] Continuation of Ser. No. 235,554, Aug. 24, 1988, abandoned.

[30] Foreign Application Priority Data

Aug. 28, 1987 [FR] France ............................. 87 12039

[51] Int. Cl.⁵ .......................... G09G 1/28; G09G 3/00
[52] U.S. Cl. ..................................... 340/701; 340/793
[58] Field of Search ............... 340/701, 702, 703, 767, 340/793; 358/429, 21 R, 81

[56] References Cited

U.S. PATENT DOCUMENTS

| | | |
|---|---|---|
| 3,821,721 | 6/1974 | Hughes . |
| 3,845,243 | 10/1974 | Schmersal et al. . |
| 4,063,231 | 12/1977 | Mayer et al. . |
| 4,703,318 | 10/1987 | Haggerty ............................. 340/793 |
| 4,706,077 | 11/1989 | Roberts et al. ....................... 340/793 |
| 4,779,083 | 10/1988 | Ishii et al. ........................... 340/793 |
| 4,791,417 | 12/1988 | Bobak ................................. 340/793 |
| 4,808,991 | 2/1989 | Tachiuchi et al. ................... 340/793 |
| 4,827,255 | 5/1989 | Ishii .................................... 340/793 |
| 4,833,464 | 5/1989 | Di Santo et al. ..................... 340/793 |
| 4,857,909 | 8/1989 | Mizushima .......................... 340/793 |

FOREIGN PATENT DOCUMENTS 2536565 5/1984 France .

Primary Examiner—Ulysses Weldon
Assistant Examiner—M. Fatahiyar
Attorney, Agent, or Firm—Cushman, Darby & Cushman

[57] ABSTRACT

The system provides for a function of smoothing, and therefore, softening the contours without any loss in addressability, as well as for the homogenization of the spatial distribution in the screen. It has a microprocessor based management and control circuit, an image generator, an image memory, a scanning circuit in X and Y directions and a video processing set placed between the memory and the matrix screen display device. The management and processing circuits are determined so that the matric scan is done by taking into account, for each image point to be displayed, data stored in a zone of the image called a micro-region, formed by at least three pixels in X and at least three pixels in Y, the micro-region being centered on the coordinates of the image point to be displayed.

8 Claims, 5 Drawing Sheets

SYSTEM FOR THE DISPLAY OF COLOR IMAGES ON MATRIX DISPLAY PANELS

This is a continuation of application Ser. No. 07/235,554, filed on Aug. 24, 1988, which was upon the filing hereof, now abandoned.

BACKGROUND OF THE INVENTION

1. Field of the Invention

The present invention concerns a system for the display of color images on a matrix display panel, for example, a liquid crystal display panel. The invention is concerned more especially with the display of synthetic images but also applies to images from video image sensors such as, for example, vidicon cameras.

The invention relates more especially to an image processing system suited to display on a matrix display panel. This special type of processing produces a first function for smoothing and softening contours without any loss in addressability and, also, homogenization of the spatial distribution in the screen. The result of this is an improvement in image quality and visual comfort for the observer.

2. Description of the Prior Art

One of the problems encountered with matrix display panels relates to the restitution of synthetic images or images coming from video sensors on these discretized structures.

These screens consist of a matrix of elementary points which can be addressed individually by two orthogonal arrays of electrodes respectively corresponding to rows and columns. A liquid crystal display panel, for its part, is sandwiched between two arrays of electrodes. Furthermore, colored filters separated by opaque strips are placed on the display side to obtain the basic colors, red, green and blue abbreviated as R, G and B. An RGB trio corresponds to a color point. It is necessary to distinguish the image point, corresponding to an item of information which comes from the image generator (graphic processor or sensor) and may or may not be stored in an image memory, from the elementary point of the screen which is most often called a pixel and corresponds to the smallest addressable unit of the screen. A trio thus comprises three pixels.

As a rule, the size of a pixel is smaller than the eye's separating capacity: it then becomes necessary to consider no longer an elementary point or pixel but a region consisting of a set of these juxtaposed points.

The invention applies to this mode of observation of the screen according to which the elementary point of the screen is replaced by a small region, called a "micro-region" corresponding to the visual performance of the observer and, hence, to his perception of the image.

The micro-region is characterized by several parameters, essentially its position, shape, luminosity, color, the arrangement of the colored pixels, etc.

A given image may thus be considered to consist of a set of micro-regions with characteristics that may vary as a function of various parameters, such as: the nature of the plotting (line, color range, colored surface, alpha-numerical character, etc.), elements coming from an image sensor etc.

The method used, therefore, makes it possible to adapt the restitution of the image as a function, especially, of the nature of the image (whether it is a synthetic image or one coming from a sensor), the type of matrix display, the distribution of the color pixels (whether tripled or quadrupled), faults in the screen and the conditions under which the image is observed (day or night).

Another object of the invention is to obtain half tones (also called grey tones).

SUMMARY OF THE INVENTION

The invention proposes a system for the display of color images on a matrix display panel, comprising:

means for the management and control of a set, said means grouping:

a generator of the image to be displayed, an image memory to store the image to be displayed, scanning means to control the extraction of the image from the memory according to a matrix scan defined in X and Y, means to process the extracted image, and means to display the processed image on a matrix display panel, wherein said management and control means and processing means are defined so that the matrix scan is done with the taking into account, for each image point to be displayed, of data stored for a small zone of the image, called a micro-region, formed by a number n of pixels in X and a number m of pixels in Y, n and m each being at least equal to three, said micro-region being centered on the coordinates of the image point to be displayed.

BRIEF DESCRIPTION OF THE DRAWINGS

The special features and advantages of the present invention will appear in the following description, which is given by way of example and is made with reference to the appended figures, of which:

FIGS. 2A, 2B and 2C are examples defining a micro-region for color matrices with diagonal, linewise and quad arrangements, respectively, of the RGB pixels;

DESCRIPTION OF PREFERRED EMBODIMENTS

Figure 1:
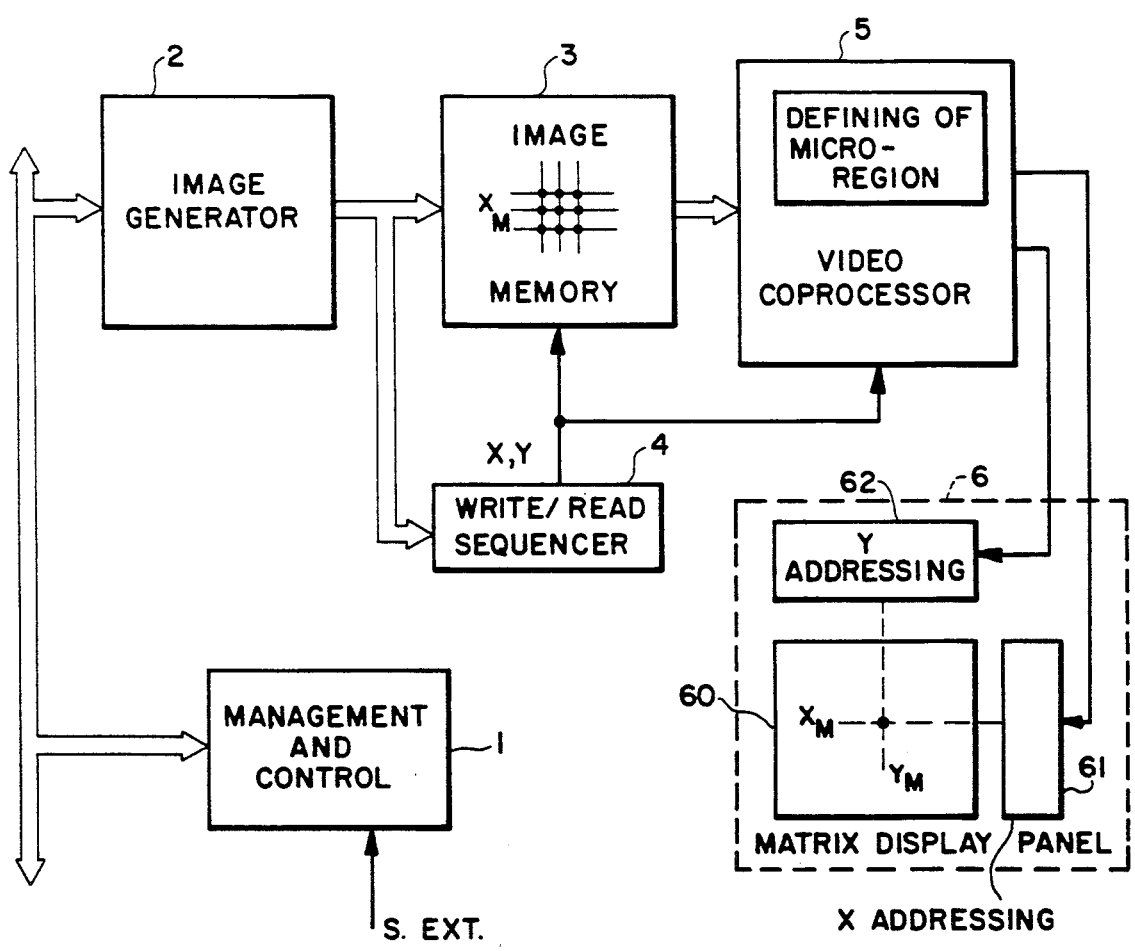
FIG. 1 is a general diagram of a display system according to the invention.

Referring to FIG. 1, the system comprises a management and control circuit 1, for example, a microprocessor set, capable of receiving external control signals $S_{ext}$ and connected by a bus to an image generator 2 which is itself connected to an image memory 3 and a write/read sequencer device 4, namely a scanning or addressing device. The output of the image memory 3 is connected to the screen addressing circuit through a processing set or video coprocessor 5. The matrix screen 6 comprises the screen proper 60 and the line addressing circuit 61 and column addressing circuit 62.

The image memory 3 is used to store the image to be displayed produced by the image generator 2. The sequencer circuit 4 controls the extraction of the image from the memory according to a matrix scan defined in X and Y.

According to the invention, the system and, especially, the management and control circuit 1, the processing circuit 5 and the scanning circuit 4 are determined so that the matrix scanning is done by considering, for each image point displayed, the data stored in several pixels in X and several pixels in Y in the memory 3. Letting m and n respectively define the number of pixels picked up at X and Y, the storage zone of the image, called a micro-region formed by the n.m pixels, is used to form the image point to be displayed. The micro-region taken into account is substantially centered on the coordinates $X_M Y_M$ of an image point M to be displayed. The values n and m are determined so that they are at least equal to three pixels respectively in X and Y. In the example, $n=m=3$, a minimum micro-region of nine pixels is obtained, the central pixel corresponding to the coordinates $X_M$ and $Y_M$ of the image point to be displayed.

The passage to the following coordinate point $X_{M+1}$ along the x-axis can be done in the usual conditions, namely with a resolution equal to one pixel. Thus, there is no loss of addressability.

The micro-region may be rectangular, square or of any shape. It may have fixed dimensions (with m and n constant) or variable dimensions (with m and n variable). The micro-region is determined by the video processor and the management and control circuit 1 as a function of different parameters relating to the nature of the image (whether alphanumerical, synthetic or coming from a video sensor or any other type of image), the nature of the screen (the distribution of color pixels in the screen, the directivity of the transmission etc.), the state of the screen (the faults displayed by the screen), the definition (the number of points in the image), information relating to the plotting (X and Y coordinates, color, luminosity, nature, namely whether line or area, etc.).

The image is processed by micro-region, each micro-region consisting of an equal number of red (R), green (G), or blue (B) elements, the distribution and number of which depends on the screen structure (the arrangement of the colored filters) considered. The size of the micro-region is defined as a function of the eye's separating capacity which is about one angular minute and the observation distance.

Figures 2A, 2B, 2C:
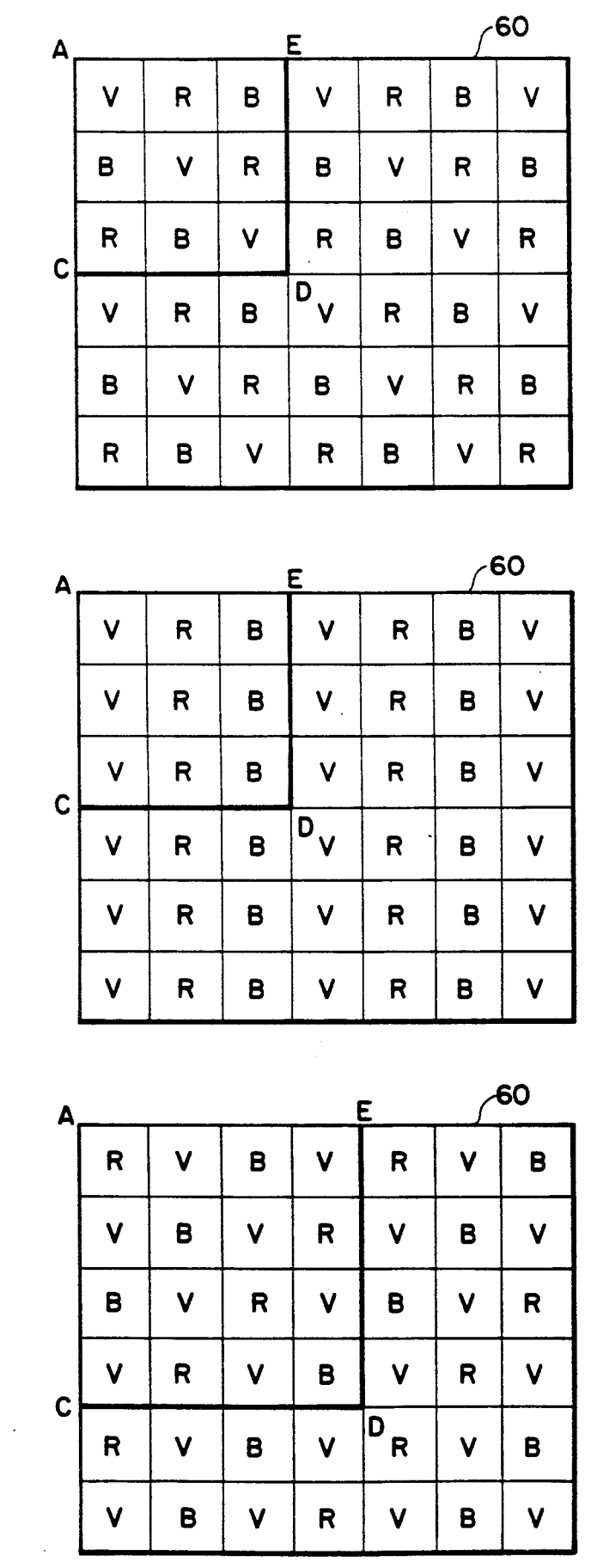

Referring to FIG. 2, we shall consider an example of an image with a rectangular format ACDE made on a screen comprising colored filters arranged diagonally according to FIG. 2A. The smallest elementary cell consists of 3×3 square-shaped picture elements or pixels. These micro-regions may also overlap one another in being offset by a single pixel; hence, the addressing precision of the screen is not altered.

The figures that follow, 2B and 2C, indicate this minimum elementary micro-region for line and quad configurations respectively. The shape of the micro-region may be different for images of different formats, differing for example in a ratio of 3/4 for a rectangular format.

Figure 3A:
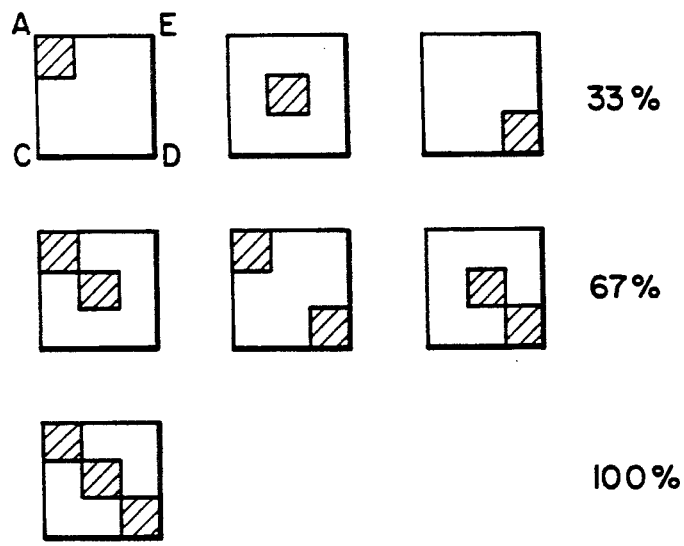
FIGS. 3A, 3B and 3C show the distribution of pixels corresponding to the micro-region according to FIG. 2A for green, red and blue respectively to obtain luminosity levels of 33%, 67% or 100% of the color considered.

FIG. 3A gives different possible configurations in the micro-region according to FIG. 2A with a diagonal arrangement for green and with different percentages of luminosity of pure colors. In illuminating a single pixel as shown in the upper part of the figure, a percentage of 33% is obtained. In illuminating two pixels according to the three possible alternatives shown on the intermediate line, about 67% is achieved. In illuminating the three pixels of the green diagonally, luminosity of 100% is achieved for this color.

Figure 3B:
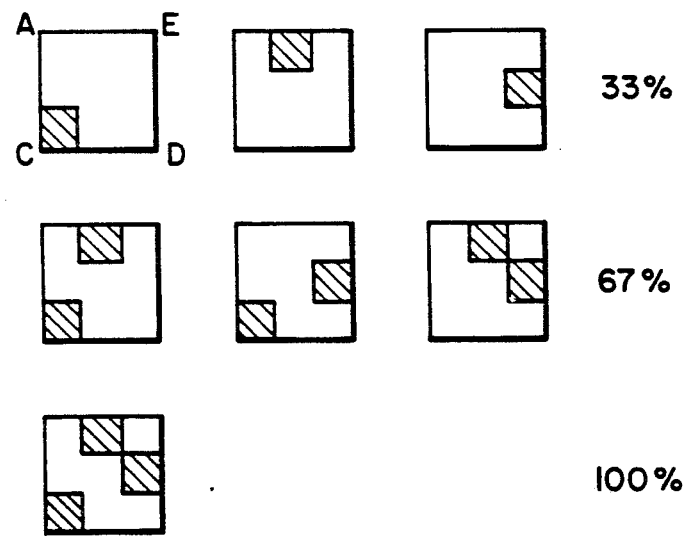
Figure 3C:
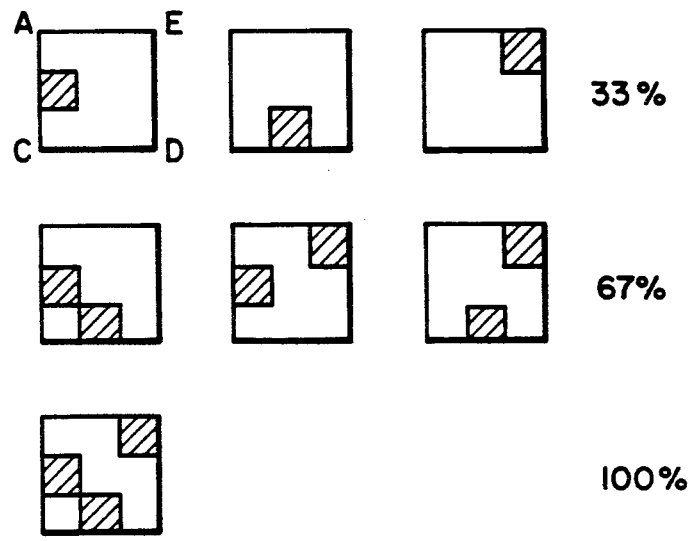

FIGS. 3B and 3C also show these luminosity variations in the case of the other two colors, red and blue respectively.

Thus, different levels of luminosity have been achieved while, at the same time, maintaining maximum voltage in the liquid crystal and, hence, a maximum viewing angle. The 33% and 67% level states correspond to so-called grey or half-tone intermediate states and, in the final analysis, a richer range of colors is obtained, this range of colors depending on the number of colored pixels included inside the micro-region.

Figure 4:
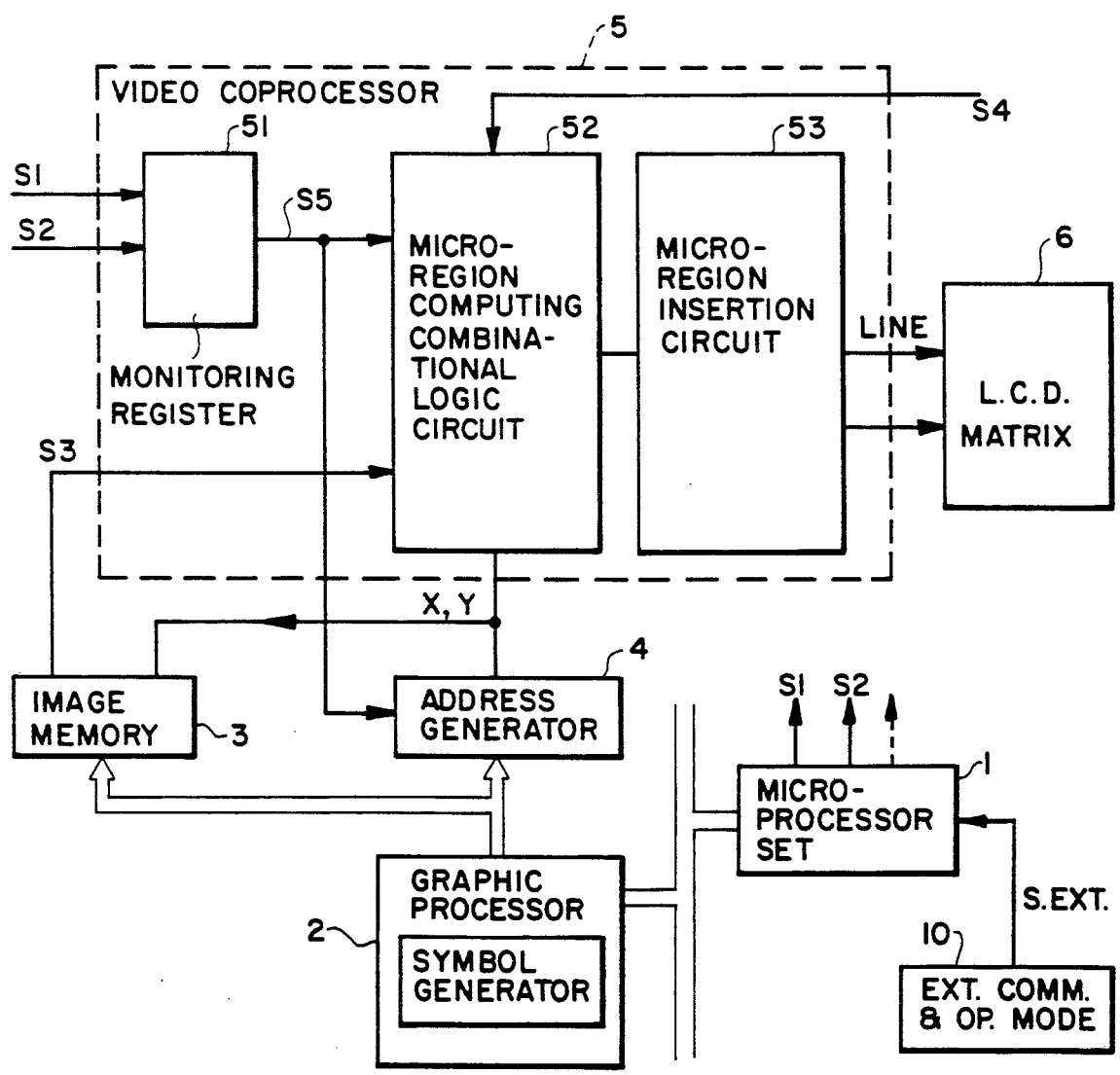
FIG. 4 is a diagram of an embodiment of the system according to FIG. 1 showing the functional breakdown of the video processor determining the micro-region.

FIG. 4 gives a more detailed view of an embodiment of the video coprocessor 5. This example considers a synthetic video picture given by a graphic processor 2 and stored in the image memory 3. The external signals $S_{ext}$ are signals pertaining to the choice, the operating mode and the various commands given by the user, said functions being symbolized by the block 10.

The video coprocessor 5, which enables a definition of the micro-region, consists of a monitoring register circuit 51, the output signal of which identifies a typical micro-region configuration according to the incident parameters received by the register. These parameters, given by the microprocessor 1, include the information S1 on the nature of the image (whether it is synthetic or not) and the information S2 relating to the type of matrix used. The output S5 of the supervising register 51 is applied to a combinational logic circuit 52 for the computation of the micro-region as well as to the address generator 4. The logic circuit 52 prepares the shape of the micro-region designated by the register and its content as a function of the incident parameters S1 and S2 and, also, as a function of the paramater S3 relating to the nature of the plotting and its luminosity and color. The information S3 is extracted from the image memory, where it has been inserted, by means of the graphic processor and the programming of the set 1.

The logic circuit 52 is followed by a circuit to insert the micro-region 53 in the display panel matrix 6. The circuit 53 delivers the addresses and the content of the successive lines of the screen to be addressed.

Figure 5:
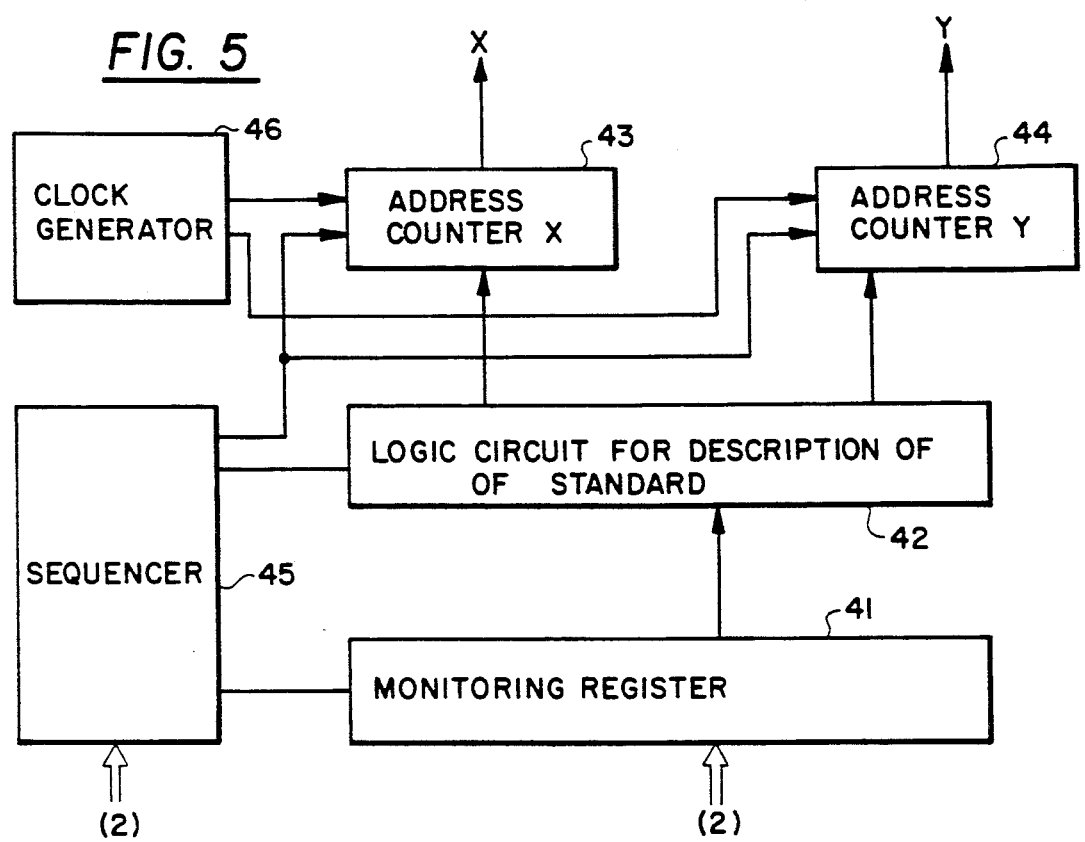
FIG. 5 is a diagram of the addresses generator used in the example of FIG. 4.

The address generator shown in FIG. 5 consists of an interface register 41 connected by a data bus to the graphic processor 2. The data are transferred through the register 41 to a logic circuit 42 for the description of standards. This logic circuit 42 constitutes a conversion table and can be made with programmable read-only memories or PROMs. This logic circuit initializes the downline X and Y address counters, 43 and 44. These counters may be 10-bit chargeable counters. A programmed sequencer 45 is connected to the control bus of the graphic processor 2. It controls the circuits 41 to 44. Finally, a quartz clock generator 46 fixes the plotting frequency.

Figure 6:
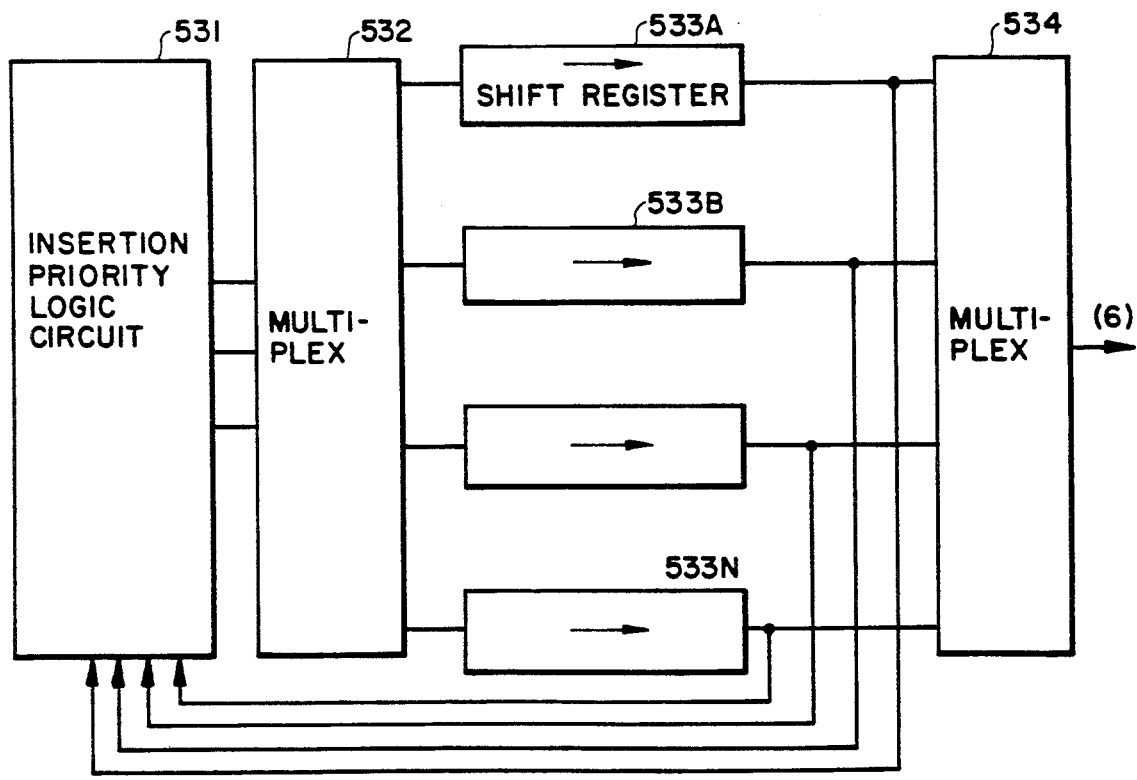
FIG. 6 is a diagram of the insertion circuit of the micro-region in the embodiment according to FIG. 4.

The micro-region computing combinational logic circuit 52 (FIG. 4) produces computations by means of so-called PAL (programmable array logic) circuits. FIG. 6 represents the insertion circuit 53 which consists of an insertion priority logic circuit 531 which may also consist of PAL circuits, a multiplex circuit 532, shift registers 533A to 533N, with a length which can be adapted to the screen used, especially to the number of points of the display. These register circuits 533A to N are connected at their output to the logic circuit 531 and to a terminal multiplex circuit 534 which delivers the signals designed for the display matrix 6.

The above-described embodiment is not restrictive. The technique implemented can be applied, among others, to micro-regions of screens with differently colored filters, micro-regions that are variable in shape and size according to the addressed zone (depending on whether the plotting is a line or a color range), micro-regions whose size depends on the sensor (FLIR, CCD, VIDICON) and micro-regions depending on observation conditions (the light environment, day or night, angle of observation, etc.)

The described mode of processing by micro-region can be extended to micro-regions with an angular size greater than the eye's separating capacity and to systems used to obtain intermediate tones called grey tones.

What is claimed is:

1. A system for displaying color images on a matrix display panel, comprising:
   a generator for generating an image to be displayed,
   an image memory, coupled to the generator to receive the image to be displayed, for storing the image,
   scanning means for reading the image from the image memory according to a matrix scan defined in X and Y coordinates,
   means for processing, in accordance with characteristics of a plurality of micro-regions of the matrix display panel, the image read from the image memory to produce a processed image, the processed image being defined by a plurality of image points to be displayed on the matrix display panel,
   means for displaying the processed image on the matrix display panel, and
   management and control means for determining dimensions of each of the micro-regions, each of the micro-regions comprising a first number n of pixels in the X direction and a second number m of pixels in the Y direction, n and m each being at least equal to three, and for controlling the display means to display each of the image points in a respective one of the micro-regions, the center of said each micro-region being substantially located at the center of the respective one of the image points, the image points being displayed such that a first one of the micro-regions and at least a second one of the micro-regions partially overlap.

2. A system according to claim 1, wherein the management and control means determine the dimensions of the micro-regions as a function of parameters relating to characteristics of the image including information relating to type of the image and origin of the image, characteristics of the matrix display panel including information relating to distribution of color pixels and directivity of transmission, a condition of the matrix display panel including faults displayed, a number of points of the image and plotting information including information relating to X and Y coordinates, color, luminosity, line and area.

3. A system according to claim 1 wherein said scanning means includes addressing means which, by restricted addressing of a number of pixels among the m.n pixels of the micro-region, produces one of half tones and grey tones in a desired color.

4. A system according to claim 1, wherein the processing means comprises a monitoring register for receiving information pertaining to characteristics of the image and the display matrix panel and producing a signal pertaining to a type of the micro-regions, a combinational logic circuit for computing a shape of the micro-region in accordance with the signal and information relating to characteristics of the matrix display panel, and a circuit for providing addressing data relating to the micro-regions to the matrix display panel.

5. A system according to claim 1, wherein the micro-regions have a predetermined shape, the parameters n and m which define the shape of the micro-region being one of fixed and variable.

6. A system according to claim 5, wherein the management and control means determine the dimensions of the micro-regions as a function of several parameters relating to characteristics of the image including information relating to type of the image and origin of the image, characteristics of the matrix display panel including information relating to distribution of color pixels and directivity of transmission, a condition of the matrix display panel including faults displayed, a number of points of the image and plotting information including information relating to X and Y coordinates, color, luminosity, line and area.

7. A system according to claim 5, wherein said scanning means includes addressing means which restrict addressing of a number of pixels among the m.n pixels of each of the micro-regions to produce one of half tones and grey tones in a desired color.

8. A system according to claim 5, wherein the processing means comprises a monitoring register for receiving information pertaining to characteristics of the image and the display matrix panel and producing a signal pertaining to a type of the micro-regions, a combinational logic circuit for computing a shape of the micro-region in accordance with the signal and information relating to characteristics of the matrix display panel, and a circuit for providing addressing data relating to the micro-regions to the matrix display panel.

* * * * *